(No Model.) 7 Sheets—Sheet 1.

J. F. GOLDING.
MACHINE FOR MAKING EXPANDED METAL.

No. 581,713. Patented May 4, 1897.

WITNESSES:
Geo. E. Curtis
H. W. Munday

INVENTOR:
John F. Golding
BY Munday, Evarts & Adcock,
HIS ATTORNEYS.

(No Model.)　　　　　　　　　　　　　　　　　　　　　7 Sheets—Sheet 2.
J. F. GOLDING.
MACHINE FOR MAKING EXPANDED METAL.

No. 581,713.　　　　　　　　　　　　Patented May 4, 1897.

WITNESSES:　　　　　　　　　　　　　　　　INVENTOR:
　　　　　　　　　　　　　　　　　　　　　JOHN F. GOLDING
　　　　　　　　　　　　　　　　BY Munday, Evarts & Adcock.
　　　　　　　　　　　　　　　　　　　　HIS ATTORNEYS

(No Model.)

J. F. GOLDING.
MACHINE FOR MAKING EXPANDED METAL.

No. 581,713. Patented May 4, 1897.

WITNESSES:
Sew. E. Curtis
H. W. Munday

INVENTOR:
JOHN F. GOLDING
BY Munday, Evarts & Adcock
HIS ATTORNEYS.

United States Patent Office.

JOHN F. GOLDING, OF CHICAGO, ILLINOIS, ASSIGNOR TO THE EXPANDED METAL COMPANY, OF SAME PLACE.

MACHINE FOR MAKING EXPANDED METAL.

SPECIFICATION forming part of Letters Patent No. 581,713, dated May 4, 1897.

Application filed May 20, 1896. Serial No. 592,254. (No model.)

*To all whom it may concern:*

Be it known that I, JOHN F. GOLDING, a citizen of the United States, residing in Chicago, in the county of Cook and State of Illinois, have invented a new and useful Improvement in Machines for Making Expanded Metal, of which the following is a specification.

This invention relates to improvements in machines for the manufacture of open or reticulated metal-work of the kind commonly known as "expanded sheet metal" or metallic trellis-work.

According to my improved machine the meshes of the expanded sheet metal are produced by cutting a series or row of slits and simultaneously with such cutting operation opening the slits mainly by stretching the strips or strands of metal in contiguity to the aforesaid slits, this stretching operation being effected by stretching the strips or strands downward in a direction approximately at right angles to the plane of the sheet.

It is an essential feature in my present machine that the meshes in the sheet metal are produced by stretching instead of by simply bending the aforesaid strips or strands, as heretofore.

In carrying my invention into practice I cut the series of slits in a straight line parallel to the edge of the metal sheet by means of knives, one of which is stationary and has a plain cutting edge, while the other is capable of reciprocating up and down and has a cutting edge of sinuous form. The reciprocating knife may be shifted laterally after each operation and the metal sheet be at the same time fed forward the proper distance to receive a fresh series of slits opposite the portions unsevered at the previous operation, or the said sheet may itself be shifted laterally instead of the knife.

In order that my invention may be clearly understood and readily carried into effect, I will proceed to describe the same more fully with reference to the accompanying drawings.

Figs. 5 to 10 are drawn on an enlarged scale in order that the parts may be more clearly seen.

Figures 1, 2:
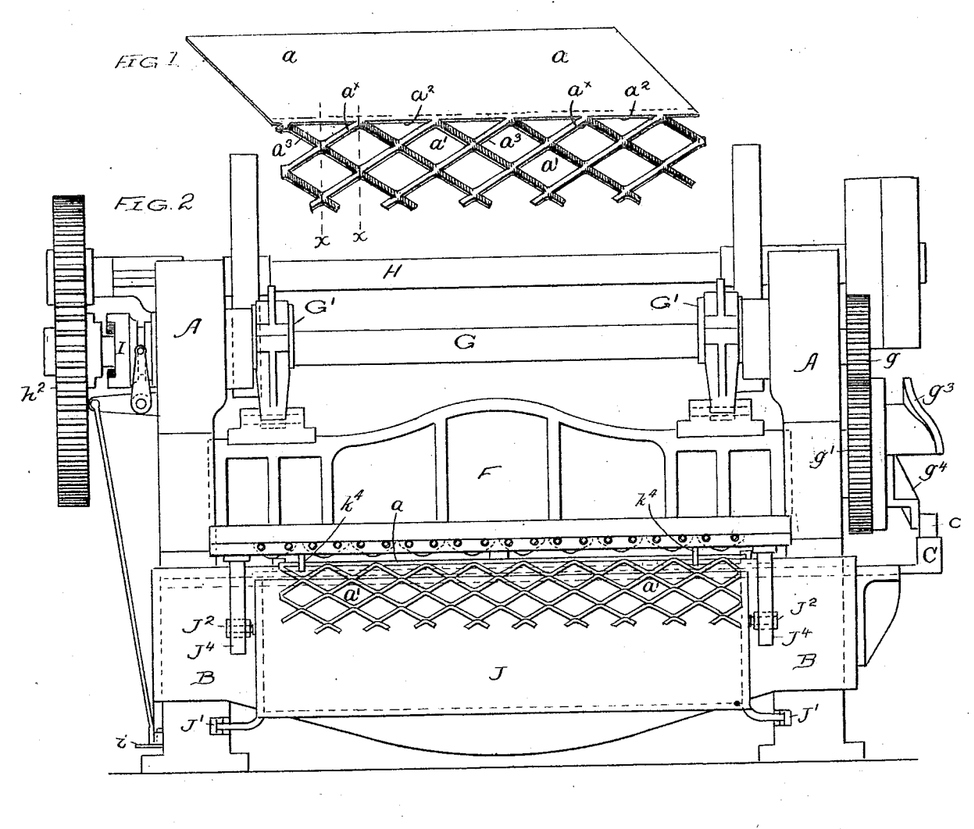
Figure 1 is a perspective view of a metal sheet a portion of which has been expanded or formed into trellis-work by my machine.
Fig. 2 is a front elevation of the machine.
Figure 3:
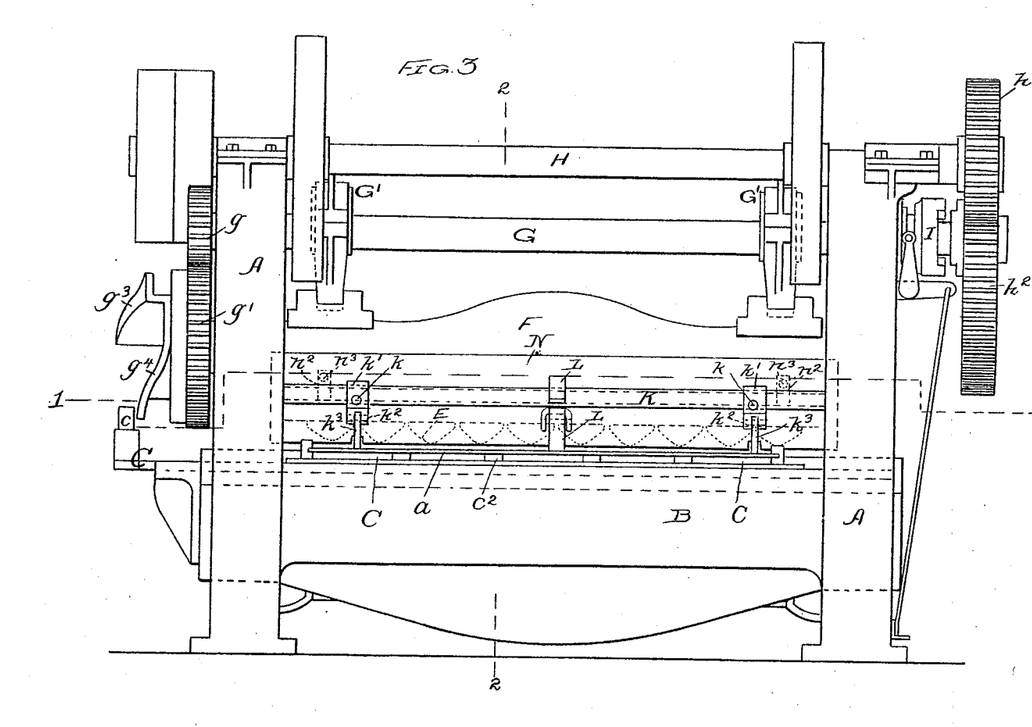
Fig. 3 is a rear elevation thereof.
Figure 4:
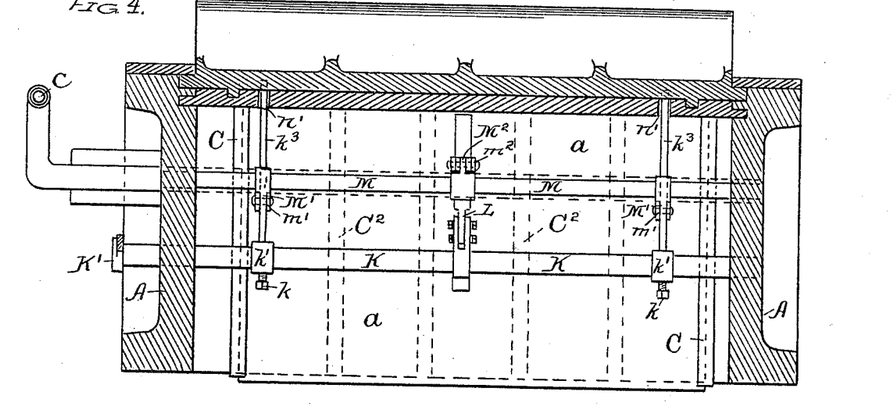
Fig. 4 is a horizontal section of the machine, taken on the line 1 1 of Fig. 3.
Figure 5:
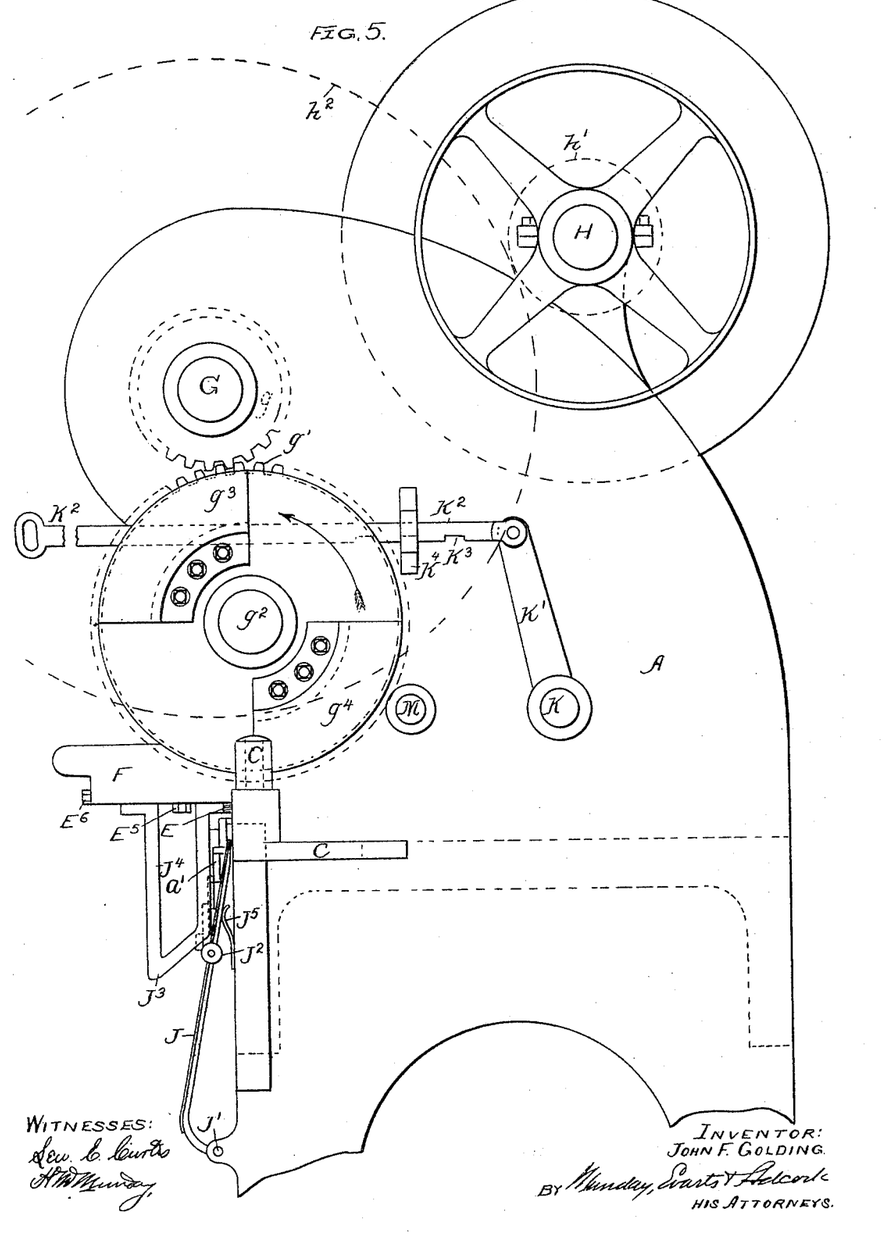
Fig. 5 is an end view of the machine as seen from the right of Fig. 2.

Referring first to Fig. 1, $a$ is a metal sheet from which the meshes $a'$ have been produced by the improved machine. $a^2 a^2$ are the slits or incisions which are cut in a straight line near the front edge of the metal sheet, and $a^3 a^3$ are the strips or strands of metal as they appear after being stretched by the pressure of the sinuous edge of the upper or reciprocating knife acting thereon during its downward stroke. The act of stretching the series of strips or strands $a^3$ in this way produces a row of triangular meshes or semimeshes adjacent to the edge of the metal sheet. After the formation of these semimeshes the metal sheet is shifted laterally for a distance equal to the space between the vertical lines $x\ x$, that is to say, a distance equal to half a mesh. The metal sheet is then also fed forward a distance equal to the width of the strips or strands $a^3$. The reciprocating knife then again descends and produces a second row of semimeshes immediately above the row produced at the previous operation. A row of complete meshes of lozenge shape is thus formed. The metal sheet is then again shifted laterally, but in the opposite direction to its former lateral movement, and is also again fed forward. The metal sheet is then ready to be once more acted upon by the knives in forming another row of semimeshes above the previous row in the manner already stated.

Referring now to Figs. 2 to 10, A A are end standards rigidly connected together near their lower ends by a strong frame B, the upper portion of which serves as a support to receive a laterally-reciprocating table C for the metal sheet or blank $a$. D is the plain-edged knife, which is secured to the front edge of the table C by screws D'. E is the sinuous-edged knife, which is composed of a number of separate cutters having spaces between them. These cutters are carried by a reciprocating head F, which receives a rectilinear up-and-down movement from eccentrics G' G', mounted on a shaft G, that is driven from a counter-shaft H by means of suitable toothed wheels $h'$ $h^2$. I is a clutch which can be operated from a treadle $i$ for throwing the said shaft G into or out of gear with the aforesaid toothed wheels $h'$ $h^2$. $g$ is a toothed pinion which is keyed to one end of the shaft G and gears with a toothed wheel $g'$, mounted on a stud $g^2$, projecting from the outer face of the end frame of the machine. This wheel $g'$ is provided with two cam-pieces $g^3$ $g^4$, which are so shaped that when the machine is working they give a lateral movement to the before-mentioned table C first in one direction and then in the other, with a pause between each movement, by acting on a roller $c$, carried by a pin projected upwardly from one end of the table. On the under side of the said table is a fillet $c'$, which works in a groove in the frame B and guides the table during its movements. The surface of the table is provided with a series of transverse bars $c^2$, upon which the under side of the metal sheet $a$ rests, and the two outermost of these bars are formed with grooves $c^3$, into which the end edges of the sheet enter and by which the said sheet is guided as it is fed from rear to front of the machine.

The feeding of the sheet is effected by a frame or flap J, which is pivotally connected at J' to the end standards A of the machine and is provided with a roller $J^2$ at each end. These rollers are so situated that they can be acted upon by inclines $J^3$, formed on brackets $J^4$, bolted to the under side of the head F. As this head descends to bring its knives E onto the metal sheet the aforesaid inclines $J^3$ come against the rollers $J^2$ and by acting thereon cause the frame J to turn inwardly about its pivots and its upper edge to enter recesses formed therefor in the stationary knife D. (See Fig. 6.) $J^5$ are springs which act to return the frame to its outward position when the head F and its inclines $J^3$ rise. The said frame thus receives an oscillatory movement during the rise and fall of the head F, and each time it performs a forward stroke it presses against the meshes $a'$ of the expanded sheet metal in front of it, and thereby causes the sheet to advance a certain distance, ready to be acted upon at the next downstroke of the upper knives E. In order to limit the extent of this forward stroke of the said frame, and thereby regulate the feeding of the metal sheet through the machine, I provide a rocking shaft K, which is furnished at one end with a lever K', whose outer end is pivotally connected to a movable bar $K^2$, having a series of notches $K^3$ in its lower edge, Fig. 8. This notched bar $K^2$ is situated within easy reach of the machine attendant, so that he can shift the said bar in either direction and retain it in such shifted position by bringing one or other of its notches into engagement with the bracket $K^4$, in which the said bar slides. Secured to the aforesaid rocking shaft K by set-screws $k$ are sleeves $k'$, having lugs $k^2$, to which are pivotally connected arms $k^3$, having bent outer ends or fingers $k^4$, which normally lie in a stationary position in advance of the front edge of the metal sheet $a$. These fingers serve to limit the extent to which the said sheet can move forward when acted upon by the before-mentioned frame J. By shifting the notched bar $K^2$ the rocking shaft K and therefore the arms $k^3$ can likewise be shifted to bring the aforesaid fingers $k^4$ nearer to or farther from the edge of the metal sheet under operation. For the purpose of effecting a fine adjustment of the position of the said fingers relatively to the front edge of the metal sheet the rocking shaft K is formed with inclined recesses $k^5$, into which the inner ends of the set-screws $k$ enter and bear upon the metal portion $k^6$, existing between the bottoms of these recesses. (See Fig. 8.) The said sleeves are also formed with segmental slots $k^7$ for the reception of feathers $k^8$ on the rocking shaft. By turning the set-screws in one or other direction the position of the aforesaid fingers $k^4$ on the arms $k^3$ can be adjusted independently of the rocking shaft K.

The means hereinbefore described for controlling the feed of the metal sheet also enable any required width of the expanded metal to be severed from the said sheet. This is effected by merely drawing the notched bar $K^2$ outward a sufficient distance to cause the fingers $k^4$ to move inwardly and restore the metal sheet to the position it occupied prior to its preceding feeding movement. This retraction of the metal sheet does not, however, interfere with its lateral movement. Consequently when the upper knives E next descend they act upon the metal existing between and in alinement with the previous line of incisions, thereby completely severing the expanded metal from the sheet $a$. The notched bar $K^2$ is then returned to its original position, and the machine will continue working as before.

Mounted loosely on the before-mentioned rocking shaft K, so as not to turn therewith, is an arm L, which is situated approximately midway between the sleeves $k'$. The free end of this arm rests by its own weight upon the metal sheet that is being operated upon in the machine. Situated above the said arm L is a rocking shaft M, having thereon levers or lugs M' and $M^2$, which project in opposite directions. The lugs M' are pivotally connected by links $m'$ to the aforesaid arms $k^3$, and the lug $M^2$ is pivotally connected to the arm L by links $m^2$. (See Figs. 4 and 8.) So long as the free end of the arm L rests upon the metal sheet passing through the machine, the parts just above mentioned remain in the position represented by the full lines in Fig. 8; but when the rear edge of the metal sheet has advanced far enough forward to escape from beneath the free end of the arm L the latter is no longer supported by the metal sheet and therefore falls by the action of gravity into the position indicated by the dotted lines in Fig. 8. Simultaneously with the fall of the arm L the arms $k^3$ are raised by the partial rotation of the shaft M and the resulting movement of lugs M' M² in opposite directions. The fingers $k^4$ on the arms $k^3$ are thus raised out of the path of the metal sheet and no longer act to retard its forward movement. The metal sheet is therefore liberated and is free to be ejected from the machine when the frame J next performs its forward stroke. The arm L is preferably made in two pieces, which are connected together by bolts $l$, passing through slots $l'$, so that the length of the arm can be varied. In this manner I can readily regulate the periods at which the expanded sheet is ejected from the machine, and consequently the width of the plain marginal portion $a^4$, Fig. 8, with which the expanded sheet metal is sometimes provided.

Figure 6:
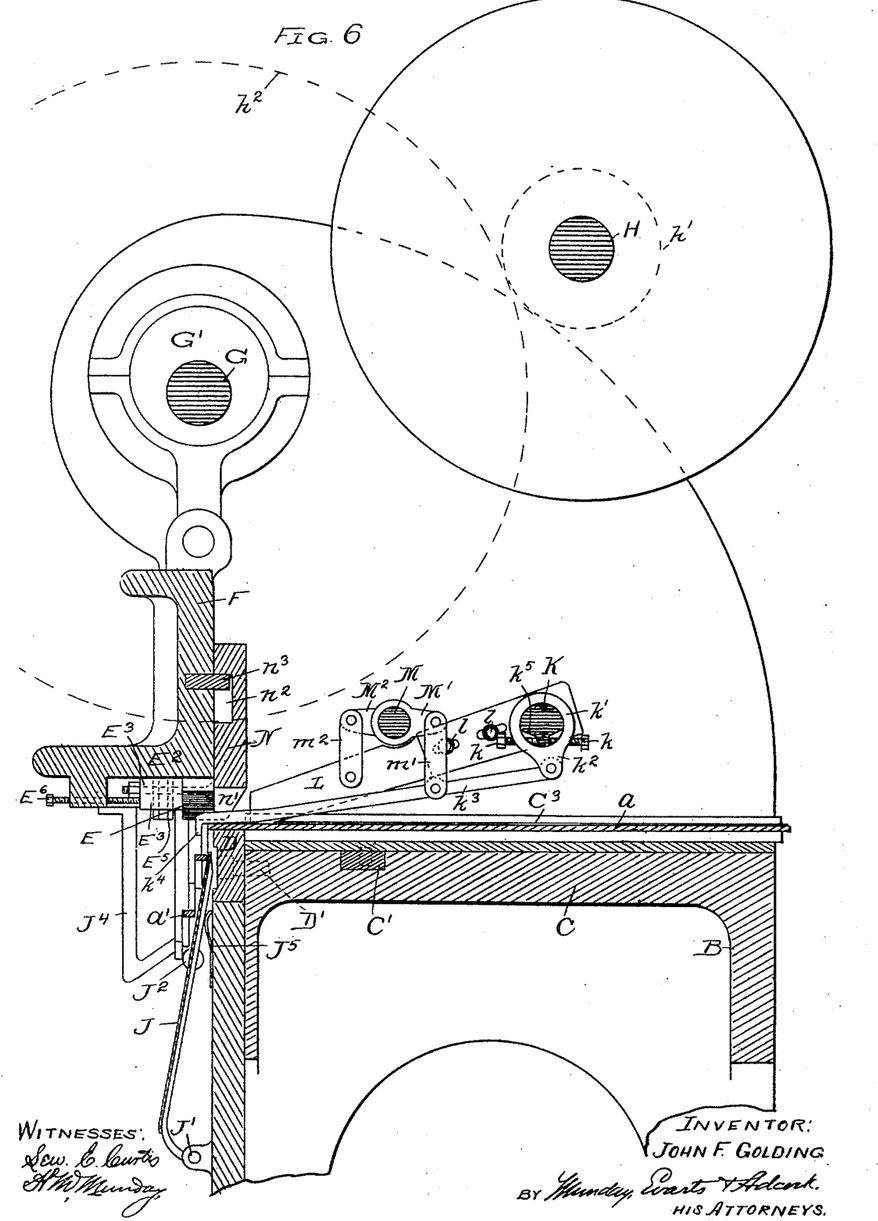
Fig. 6 is a transverse section taken on the line 2 2 of Fig. 3 and as seen from the left.
Figure 7:
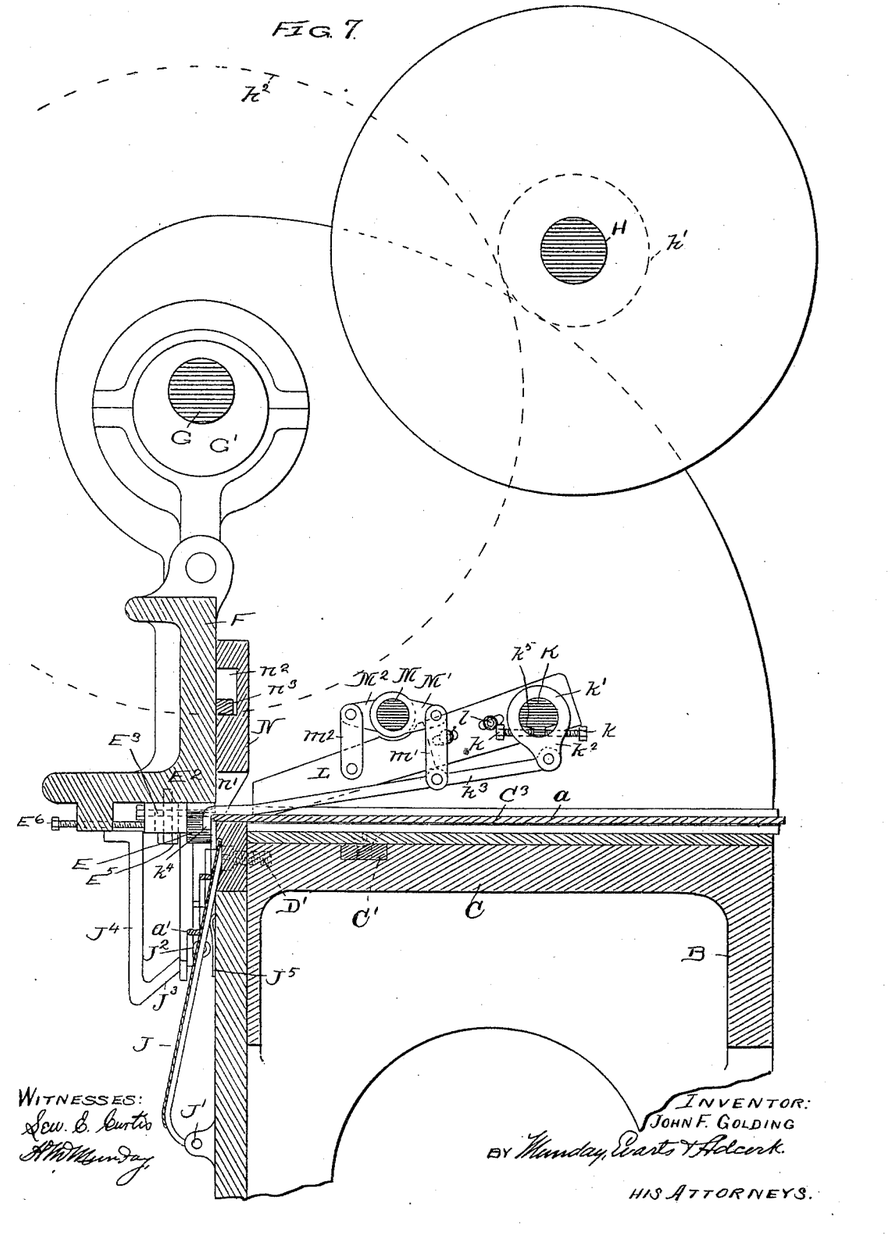
Fig. 7 is a similar section, but shows the parts in another position.
Figure 8:
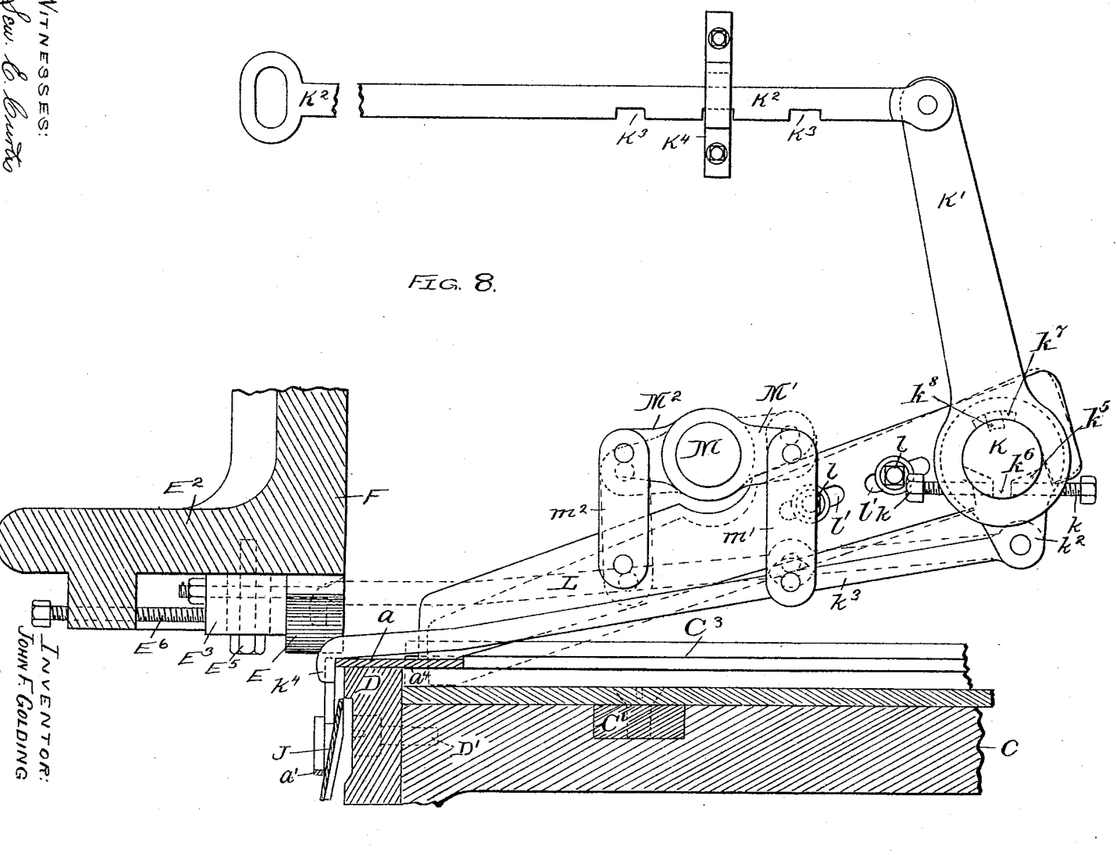
Figs. 8, 9, and 10 illustrate details which will be hereinafter more fully described.

For the purpose of firmly holding the metal sheet while the knives are acting thereon I employ a presser-bar N, Figs. 6 and 7, which is situated at the back of the head F and works in guideways formed in the end standards A of the machine. This presser-bar is formed with apertures $n'$ in its lower edge to permit of free upward movement of the fingers $k^4$ when the arms $k^3$ are raised or shifted, as hereinbefore stated. The said presser-bar is also formed with vertical slots $n^2$ at intervals for the reception of lugs or projections $n^3$, standing out from the back of the head F. These slots and lugs are so situated relatively to each other that as the head F ascends and just before completing its upward movement the lugs come against the upper ends of the slots, and thereby lift the said presser-bar N out of contact with the metal sheet, so as not to impede the forward and lateral movements of the latter at the required times. When the head F again descends, the presser-bar comes into contact with the metal sheet before the knives E reach it, and therefore the said presser-bar holds it firmly against the lower knife D ready to receive the cutting and stretching operation. The presser-bar remains in this position until again lifted by the lugs $n^3$ after they reach the upper ends of the slots $n^2$ at the next ascent of the head F. A comparatively long pause in the movement of the presser-bar thus takes place, so that the metal sheet is firmly held during the whole time that it is being acted upon by the knives and until the cutting edges of the upper knives have ascended beyond the upper surface of the metal sheet.

Figure 9:
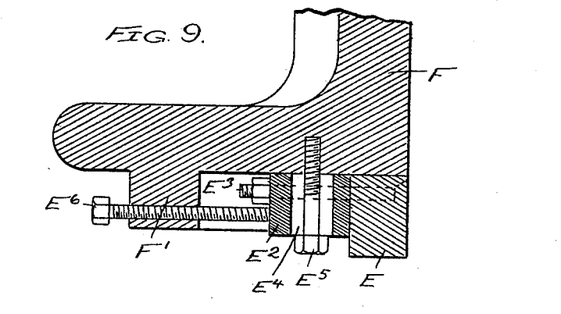
Figure 10:
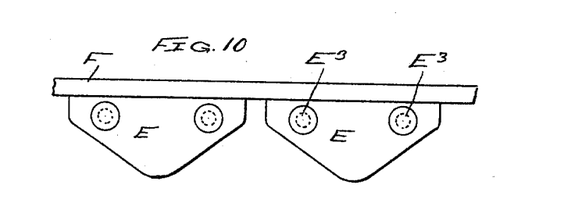

To enable the upper knives E to be readily adjusted in the head F and to permit of their being conveniently detached therefrom and replaced by others, I connect them to the head F in the manner shown at Figs. 9 and 10. Each of the knives E is bolted to a block $E^2$ by means of two bolts $E^3$, and the said blocks $E^2$ are formed with slots $E^4$, through which vertical screws $E^5$ pass for retaining the said blocks to the head F. These slots enable the knives to be shifted in a horizontal direction toward or away from the lower knife D. The under side of the head F has a flange F', carrying horizontal adjusting-screws $E^6$, whose inner ends bear upon the aforesaid blocks $E^2$. By loosening the screws $E^5$ and turning the screws $E^6$ the cutting edges of the knives E can be caused to approach nearer to or recede farther from the edge of the stationary knife D. Moreover, the aforesaid knives E can, if desired, be readily detached from the head F and be replaced by others of a different size for producing meshes of larger or smaller dimensions.

One or other of the hereinbefore-mentioned grooves $c^3$ in the outermost bars $c^2$ of the table C may be provided with a spring which is adapted to bear with some force against one edge of the metal sheet and hold it tightly in position when the said sheet is inserted into the grooves. By this means I am able to conveniently compensate for sheets of slightly-varying dimensions, whereas without the above compensating device it would be necessary to trim the edges of the sheets or otherwise treat them in order that the sheets should rest properly on the table C; otherwise unsatisfactory results would be obtained when producing expanded metal having small meshes.

The working of the machine is as follows: The metal sheet $a$ is adjusted in the machine by the attendant, who for this purpose stands at the back of the machine and places the end edges of the sheet in the grooves $c^3$ in the table C. He then pushes forward the sheet as far as it will go, that is to say, until its front edge comes against the fingers $k^4$, these fingers having assumed their lowered position during the advance of the sheet owing to its front edge coming against and raising the arm L. At this time the head F and its knives E are in their fully-raised position, as also is the presser-bar N, and the frame J is in its forward position. The machine is now set in motion by actuating the treadle $i$. The head F and presser-bar N then descend together until the said presser-bar, which projects somewhat beyond the knives, bears upon the metal sheet $a$. The presser-bar now remains stationary while the head F continues to descend, the lugs $n^3$ and slots $n^2$ permitting of this movement. As the head F descends its inclines $J^3$ act upon the rollers $J^2$ of the frame J, thereby causing the latter to move inwardly, Fig. 7, and the upper end of the apron to be housed in the recesses in the lower knife D. The knives then simultaneously form the series of slits or incisions in the sheet $a$ and stretch the strands of metal $a^3$, Fig. 1, as already described, the lowest part of the stretched strands now lying in front of the frame J. The head F next commences to rise, and as soon as it ascends high enough to bring its lugs $n^3$ against the upper ends of the slots $n^2$ it also lifts the presser-bar N The inclines $J^3$ are also at this time removed from the rollers $J^2$, and were it not for the fact that the fingers $k^4$ are still in front of the metal $a^\times$, Fig. 1, connecting the meshes $a'$ $a'$ to the sheet $a$, the latter would be fed forward by the outward stroke of the frame J acting under the influence of its springs $J^5$. It is now, however, that the cam-piece $g^3$ on the wheel $g'$ arrives in contiguity to the roller $c$ on the table C, and by acting upon the said roller shifts the table laterally for such a distance that the new slits which will be made at the next descent of the knives E will be formed opposite the portions of metal $a^\times$ that were unsevered at the previous operation. The table C in performing its lateral movement and shifting the metal sheet in the above manner removes the portion of metal $a^\times$ connecting the meshes to the sheet, so that the fingers $k^4$ lie opposite the space in the meshes. These fingers, therefore, now no longer offer any impediment to the feeding forward of the metal sheet, and consequently the frame J rocks forward about its pivots under the action of its springs and feeds the metal sheet forward against the fingers $k^4$. The extent of this movement is equal to the width of the strand that has been previously cut and stretched. The head F and its knives E, together with the presser-bar N, then again descend and the metal is once more slit and stretched in the manner already described. After this the head F reascends and the table C is shifted laterally in the opposite direction to its former movement by the cam-piece $g^4$ acting on the opposite side of the roller $c$. The sheet is then again fed forward by the frame J, as already explained, and is ready for a fresh slitting and stretching operation to be performed. These operations continue until the rear edge of the sheet or blank passes beyond the free end of the arm L. This arm then descends and raises the fingers $k^4$, as hereinbefore described, so that the complete expanded sheet is delivered from the machine by the increased forward stroke of the frame J as the latter is turned outwardly by its springs. A fresh sheet is then inserted in place on the table C and the machine performs a similar cycle of operations as before.

What I claim is—

1. In a machine for forming expanded sheet metal, the combination with a laterally-shifting support for the sheet, an upper vertically-moving cutter and a lower stationary cutter, said cutters being adapted to slit and simultaneously stretch the metal, of devices for feeding the sheet acting upon the expanded portion thereof, substantially as specified.

2. In a machine for forming expanded sheet metal, the combination with cutters acting to slit and simultaneously stretch the metal as set forth, of devices for feeding the sheet and adapted to act upon the expanded portion thereof, devices for engaging the sheet and serving to regulate the feed, and means for shifting the sheet, substantially as specified.

3. In a machine for producing expanded sheet metal, a feeding device consisting of a hinged or pivoted spring-controlled frame and inclines carried by the reciprocating head of the machine, the said inclines acting upon the hinged or pivoted frame substantially as described and for the purpose specified.

4. In a machine for producing expanded sheet metal, a device for regulating the feed and for enabling any desired width of the expanded metal to be severed from the metal sheet, the said device consisting of arms having fingers at their outer ends and pivotally connected at their inner ends to a shaft which can be rocked in one or other direction and be retained in such position substantially as described.

5. The combination with the herein-described feed-regulating device of means for regulating the position of the fingers, the said means consisting of set-screws $k$ passing through sleeves $k'$ carrying the pivoted levers $k^3$ and acting on opposite sides of the shaft K, feathers $k^8$ on the said shaft, and segmental slots $k^7$ into which the said feathers enter, so that by turning the set-screws the sleeves can be shifted angularly in either direction on the shaft substantially as described.

6. In a machine for producing expanded sheet metal means for enabling the expanded sheet to be automatically delivered from the machine, the said means consisting of an arm loosely mounted on the shaft K with its free end normally resting on the sheet of metal passing through the machine, the pivoted arms $k^3$, and lever mechanism connecting the said arm to the pivoted arms $k^3$, substantially as described.

7. In a machine for producing expanded sheet metal, the combination with means for cutting and expanding the metal and means for feeding the sheet, of automatic means for determining when the sheet shall be ejected from the machine, substantially as specified.

8. The machine for forming expanded openwork metal sheets, wherein are combined a laterally-shifting support for the sheets adapted to shift between the cutting operations, devices adapted to engage the expanded portion of the sheets and feed them forward, a stationary straight-edged cutter, and a sinuous-edged cutter moving in a fixed vertical plane and coacting with the straight-edged cutter in severing the sheet and acting also to stretch the severed portions in a direction approximately at right angles to the plane of the sheet, substantially as specified.

9. In a machine for producing expanded sheet metal, the combination with means for cutting and expanding the metal and means for feeding the sheet, of an arm L resting at its free end upon the sheet and serving to determine when the sheet shall be ejected from the machine, substantially as specified.

10. In a machine for producing expanded sheet metal, the combination with means for cutting and expanding the metal and means for feeding the sheet, of an arm L resting at its free end upon the sheet and adjustable as to length and serving to determine when the sheet shall be ejected from the machine, substantially as specified.

11. The combination, in a machine for producing expanded sheet metal, with the cutters, the feed mechanism and the feed-regulating devices, of means for throwing said regulating devices out of action and allowing the sheet to be ejected by the feed mechanism, substantially as specified.

12. The combination, in a machine for producing expanded sheet metal, with the cutters, the feed mechanism and the feed-regulating devices, of adjustable means for throwing said regulating devices out of action and allowing the sheet to be ejected by the feed mechanism, substantially as specified.

JOHN F. GOLDING.

Witnesses:
   EDW. S. EVARTS,
   H. M. MUNDAY.